United States Patent
Newstrom

(10) Patent No.: US 10,590,845 B1
(45) Date of Patent: Mar. 17, 2020

(54) CAM-DRIVEN RADIAL ROTARY ENGINE INCORPORATING AN HCCI APPARATUS

(71) Applicant: Roderick A. Newstrom, Garland, TX (US)

(72) Inventor: Roderick A. Newstrom, Garland, TX (US)

(*) Notice: Subject to any disclaimer, the term of this patent is extended or adjusted under 35 U.S.C. 154(b) by 0 days.

(21) Appl. No.: 15/952,830

(22) Filed: Apr. 13, 2018

Related U.S. Application Data

(60) Provisional application No. 62/485,227, filed on Apr. 13, 2017.

(51) Int. Cl.
| | | |
|---|---|---|
| *F02B 75/28* | (2006.01) | |
| *F02B 75/22* | (2006.01) | |
| *F02B 1/12* | (2006.01) | |
| *F02B 75/02* | (2006.01) | |
| *F02B 33/06* | (2006.01) | |
| *F02B 63/04* | (2006.01) | |
| *H02K 7/18* | (2006.01) | |

(52) U.S. Cl.
CPC .............. *F02B 75/28* (2013.01); *F02B 1/12* (2013.01); *F02B 33/06* (2013.01); *F02B 63/042* (2013.01); *F02B 75/02* (2013.01); *F02B 75/222* (2013.01); *F02B 2075/025* (2013.01); *H02K 7/1815* (2013.01)

(58) Field of Classification Search
CPC .. F02B 75/26; F02B 1/12; F02B 53/00; F02B 51/04; F02B 75/24; F02B 2053/005; F02B 25/08; F02B 2730/01; F02B 75/28
See application file for complete search history.

(56) References Cited

U.S. PATENT DOCUMENTS

| | | | | |
|---|---|---|---|---|
| 5,220,893 A * | 6/1993 | Costa | ............. | F02B 53/02 123/225 |
| 5,813,372 A * | 9/1998 | Manthey | ............. | F01B 3/0079 123/43 A |
| 6,412,273 B1 * | 7/2002 | Rohs | ............. | F01B 3/0005 60/39.6 |
| 6,698,394 B2 * | 3/2004 | Thomas | ............. | F01B 3/04 123/241 |
| 2006/0037567 A1 * | 2/2006 | Thomas | ............. | F02B 19/12 123/56.7 |
| 2016/0377030 A1 * | 12/2016 | Russell | ............. | F01N 3/0842 123/25 C |
| 2017/0324303 A1 * | 11/2017 | Stoltenberg | ............. | H02K 7/075 |
| 2017/0328277 A1 * | 11/2017 | Ardezzone | ............. | F01B 1/0624 |
| 2018/0156108 A1 * | 6/2018 | O'Neill | ............. | F02B 75/32 |

* cited by examiner

*Primary Examiner* — Long T Tran
(74) *Attorney, Agent, or Firm* — Eldredge Law Firm

(57) ABSTRACT

A two cycle-opposed piston, two cycle, homogenous charge compression ignition engine with cylinder sets, each cylinder set having a first cylinder with an intake port; a second cylinder coaxially aligned with the first cylinder and having an exhaust port; a first piston engaged within the first cylinder; a second piston engaged within the second cylinder; a combustion chamber formed between the first piston and the second piston; a first cam mechanically engaged with the first piston; a mechanical device to convert reciprocating motion to rotational motion connected to the second piston; and a charge pump connected to the intake port by an intake passage.

11 Claims, 11 Drawing Sheets

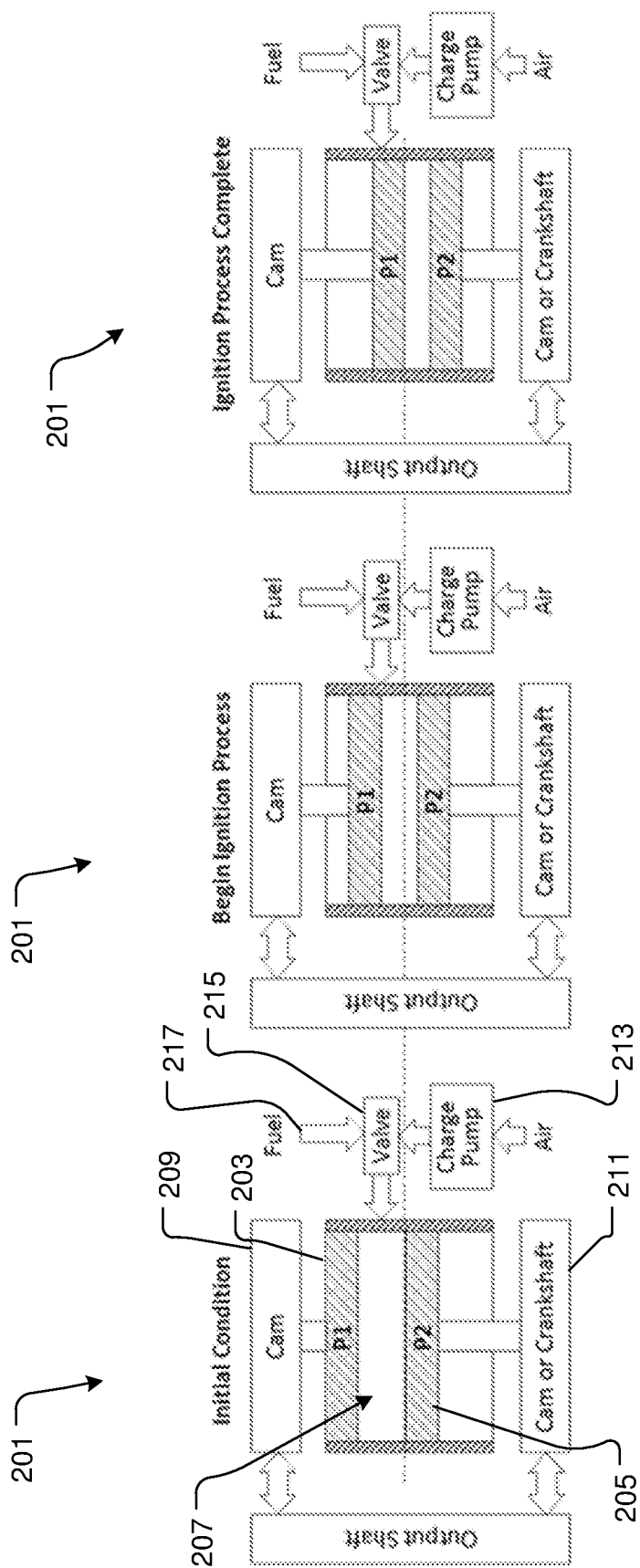

CAM-DRIVEN RADIAL ROTARY ENGINE INCORPORATING AN HCCI APPARATUS

BACKGROUND

1. Field of the Invention

The present invention relates generally to internal combustion engine systems, and more specifically, to a cam-driven radial rotary engine characterized by fuel air mixture compression with compression ignition, commonly referred to as Homogenous Charge Compression Ignition or HCCI.

2. Description of Related Art

HCCI engine systems are well known in the art. These engines may be viewed as a hybrid between traditional gasoline spark engines and diesel engines. Similar to a gasoline engine, and in contrast to a diesel engine, an HCCI engine operates on a pre-mixed charge of fuel and air. Unlike a traditional gasoline engine but similar to a diesel engine, an HCCI engine does not throttle air intake and uses the temperature created by compression to cause ignition of the fuel-air charge. This hybrid form of combustion has many benefits including increased efficiency and reduced emissions.

One of the problems commonly associated with HCCI engines is the variance of ignition timing as a function of fuel characteristics and engine operating condition. Other problems include a tendency to misfire when operating at low load with lean charge, and extreme pressure and ringing resulting from near simultaneous ignition of the entire fuel-air charge when operating at heavy load with a near stochiometric fuel-air charge. Therefore, there exists a need for a commercially viable HCCI engine capable of operating over a wide load range.

Opposed piston two stroke engines are well known in the art. These engines provide a mechanically simple engine, however, these engines have disadvantages. One disadvantage relates to difficulty in management of cylinder temperature and charge density resulting from intake and scavenge air sharing common passages to the intake port. A second disadvantage relates to difficulty in over-expansion of combustion gases resulting from gating of intake and exhaust ports by pistons. Therefore, there remains an opportunity to improve the opposed piston two stroke engine.

Rotary cam-driven radial engines are well known in the art and provide two key advantages: high power to weight ratio resulting from efficient cylinder packaging in a radial pattern; and the ability to better control piston movement and generate multiple power strokes per revolution due to the use of cams in place of crankshafts. This engine form also has two key disadvantages: difficulty in placing a spark plug or fuel injector in the combustion chamber in rotating cylinder forms of the engine; and speed limitations in all forms of the engine resulting from the high surface speed of the radial cam track. Conventional rotary cam-driven radial engines typically employ rotating cams and stationary cylinders to overcome the difficulty of installing ignition devices in rotating cylinders, but this precludes use of the more capable rotating cylinder form. Conventional rotary cam-driven engines also typically employ roller bearings as cam followers, but these bearings limit engine speed and power due to the high surface speed of the cam track.

Therefore, there remains an opportunity to improve cam-driven radial engines via an improved cam follower and by eliminating the need for a gasoline spark plug or diesel fuel injector having direct access to the rotating cylinder.

The integration of a permanent magnet motor/generator with an internal combustion engine for starting, generating electrical power, providing reverse rotation, aiding acceleration, and recapturing braking energy is common in prior art. However, motor/generators do not operate well in high temperature environments, therefore there exists a need to improve the integration of a motor/generator with internal combustion engines.

Accordingly, although great strides have been made in the area of internal combustion engines, many shortcomings remain.

BRIEF SUMMARY OF THE INVENTION

The present invention addresses the problems discussed above associated with the prior art. Specifically, the present invention addresses the uncertainty of ignition timing, tendency toward misfire when operating lean under low load conditions; immense pressure generated by near instantaneous combustion of the near stochiometric fuel air charge associated with operation at full load; limited time for proper fuel-air mixing; the inability to cool the scavenge and charge air separately; difficulty in operating cam-driven radial engines at high speed; difficulty associated with using a bare shaft or roller bearing as a cam follower; and inadequate cooling with the incorporation of a motor/generator with an internal combustion engine.

The uncertainty of HCCI ignition timing is addressed in the present invention by employing an air pump operating in conjunction with two opposed pistons operating in coaxial cylinders such that a combustion chamber is formed between the piston faces. The air pump pressurizes intake air charge to a temperature nominally below the autoignition temperature of the selected fuel. Once the intake port closes, a cam-driven piston rapidly approaches the second piston to effect autoignition only after the other second piston has started its power stroke, therefore the stroke required of the cam-driven piston is very short, and autoignition occurs rapidly, thus eliminating the negative impact of uncertain HCCI ignition timing The tendency of HCCI to misfire when operating under low load conditions is addressed in the present invention by incorporating compression beyond that required for autoignition under nominal conditions. The air pump pressurizing intake air charge is capable of producing intake temperatures just below autoignition and the stroke of the cam-driven piston is longer than the nominal requirement to insure autoignition in lean cold start conditions.

The immense pressure generated by near instantaneous HCCI combustion of a stochiometric fuel-air charge associated with full-load operation is addressed in the present invention through use of a plurality of small bore pistons. The reduced efficiency resulting from small bore pistons is overcome by HCCI efficiency, and they provide a number of benefits: small bore pistons reduce loads on engine components commensurate with available materials, they push ringing frequencies beyond human hearing, and they facilitate fine grain cylinder idling.

The limited time for proper fuel-air mixing and the inability to cool the scavenge and charge air separately within an opposed piston two stroke engine is addressed in the present invention by incorporating additional passages and additional valves between the charge pump and intake port. The limitation in effective over-expansion is addressed by addition of a secondary exhaust valve allowing the piston gating the exhaust port to continue well past that port before combustion pressure is released.

The speed limitation of cam-driven radial engines is addressed in the present invention through the use of a hydrodynamic tilt bearings as the cam follower. Using a hydrodynamic tilting pad cam follower eliminates the cost, mass, and speed/load limitations of roller bearings and also requires less space and produces less friction than a naked shaft.

The problem of inadequate cooling associated with the incorporation of a motor/generator into an internal combustion engine is addressed in the present invention by incorporating the motor/generator into the engine at a location far from the site of combustion, as well as by incorporating the drawing of air through the magnets and coils.

The present invention discloses a cam-driven radial rotary engine incorporating an HCCI apparatus and providing means to overcome the abovementioned shortcomings relevant in the art.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 2A, 2B, and 2C are simplified diagrams of an HCCI combustion apparatus in accordance with the present invention;

Figures 1A, 1B:
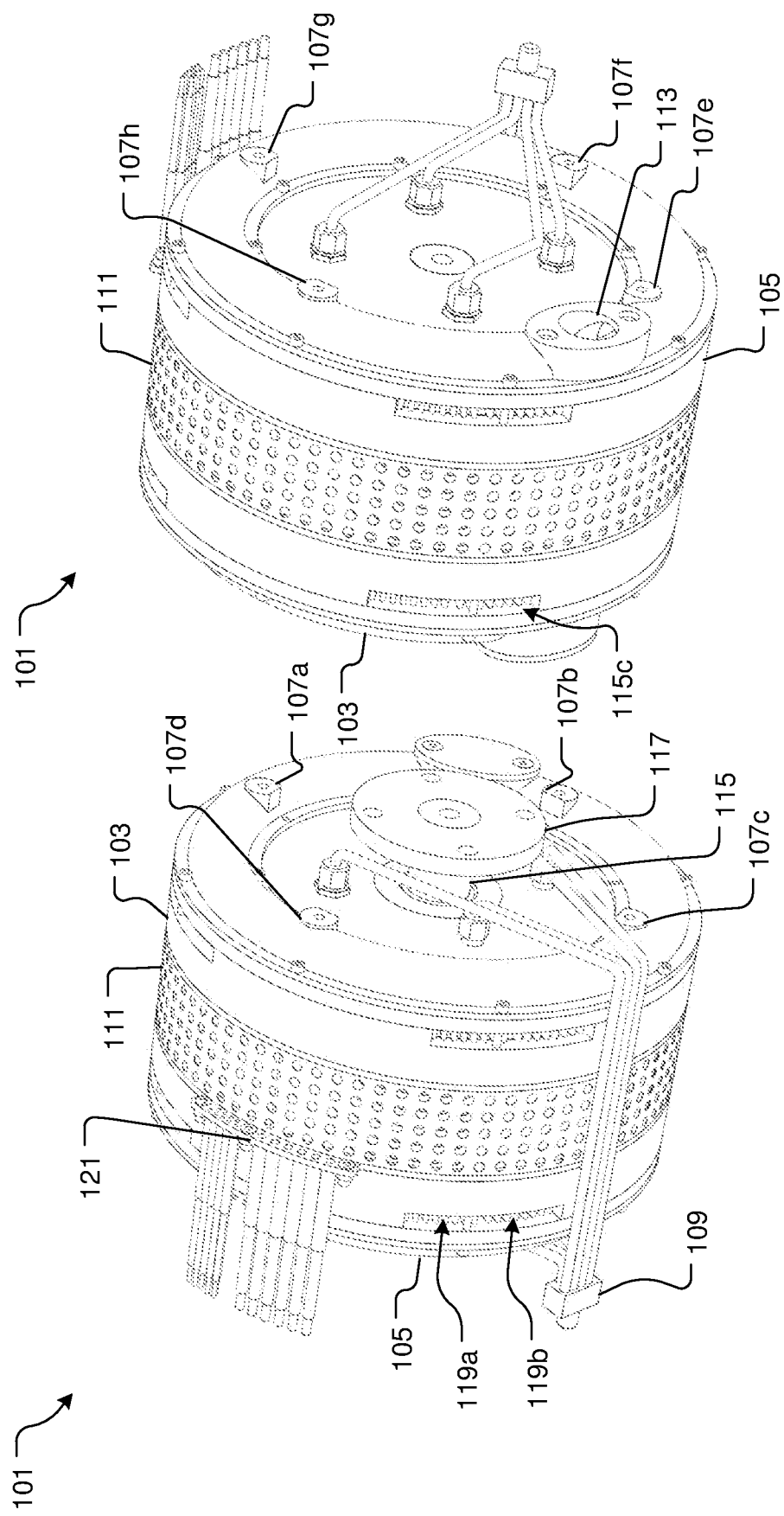
FIGS. 1A and 1B are assembled oblique front and back views respectively of an engine in accordance with a preferred embodiment of the present invention system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional HCCI engines, opposed piston two-stroke engines, cam-driven radial engines including those incorporating a motor/generator. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1A-1B depict front and back oblique views respectively of an assembled engine 101 in accordance with a preferred embodiment of the present application. It will be appreciated that engine 101 overcomes one or more of the above-listed problems discussed above.

The various components of engine 101 will be discussed in detail with reference to the plurality of drawings outlined below. As shown in FIGS. 1A and 1B, engine 101 includes a front side plate 103 and a rear side plate 105, each having a plurality of engine mounts 107*a-h* configured to facilitate engine installation and hold engine 101 stationary during operation. Engine 101 further includes a fuel distribution system 109 configured to supply fuel to fuel injectors of both side plates. Engine intake air is drawn through a rotor housing 111 and engine exhaust, combined with cooling air, exits through plates 103, 105 via one or more passages 113. Engine 101 includes an output shaft 115 and can include an output plate 117 configured to transfer mechanical power. In the preferred embodiment, engine 101 includes a plurality of inlets 119*a*, 119*b* configured to route air to the inlet of a centrifugal fan of a rotor and include cooling fins to reduce the temperature of engine oil and intake charge air. Electrical interfaces to an integrated motor/generator are provided via a printed wiring board 121. It should be understood that the motor/generator will be discussed in detail but is an optional addition to engine 101.

In FIGS. 2A, 2B, and 2C, simplified diagrams of an HCCI combustion apparatus 201 is shown. This apparatus is mechanized within the disclosed engine 101, but is also broadly applicable to other engine configurations. Apparatus 201 includes a first piston 203 and a second piston 205 in fluid communication via a common chamber 207 used for combustion. First piston 203 is driven by a cam 209 while second piston 205 is driven by either a cam follower or a crankshaft 211. Apparatus 201 includes a charge pump 213 connected to chamber 207 via a control valve 215 and a means 217 of adding fuel to the intake charge. FIG. 2A depicts pistons 203, 205 at the end of an intake cycle, during which a fuel air charge was forced into chamber 207 by the charge pump 213 and valve 215 was closed. The fuel air charge was compressed to a temperature nominally less than autoignition temperature of a selected fuel by the charge pump 213. When this condition is reached, piston 205 begins a slow downward expansion stroke while piston 203 is rapidly driven downward by cam 209, as shown in FIG. 2B. Because piston 203 moves more quickly than piston 205, this movement compresses fuel air to exceed autoignition temperature before piston 203 has completed a stroke and before piston 205 has moved far into its expansion stroke. It should be understood that autoignition occurs between stages represented in FIGS. 2A and 2C producing great pressure on pistons 203 and 205. It is important that the pressure on piston 203 produce less reverse torque on the output shaft via cam 209 than the forward torque produced by piston 205 via its crankshaft or cam 211. It should be understood that various parameters associated with apparatus 201 are selected to ensure forward shaft rotation and the pre-pressurization of the fuel-air charge to a temperature nominally below autoignition temperature of the selected fuel while minimizing the stroke required of piston 203.

Figure 3:
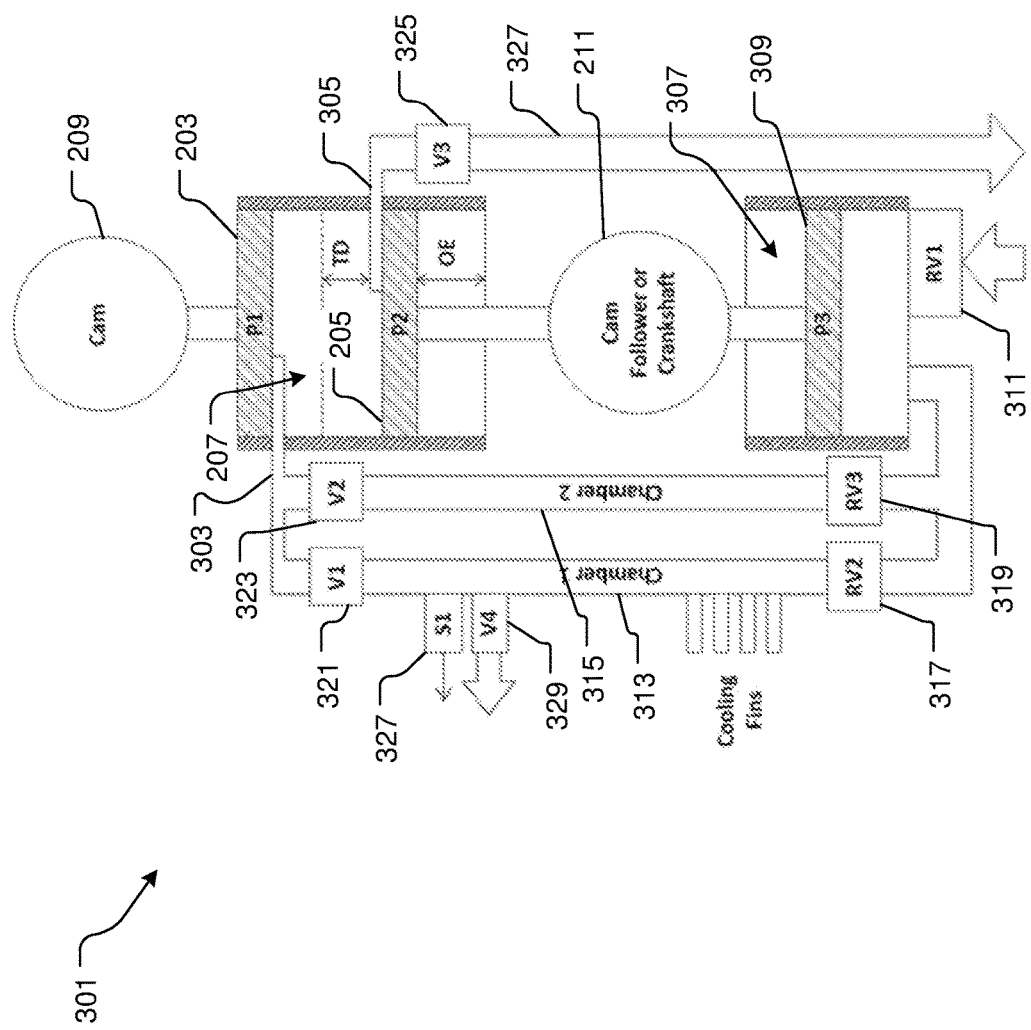
FIG. 3 is a simplified diagram of an opposed-piston two stroke HCCI apparatus in accordance with the present invention.

In FIG. 3 a simplified diagram of an opposed piston two stroke engine 301 incorporating the HCCI combustion apparatus of FIG. 2 is shown. Engine 301 includes fist piston 203 connected to and controlled by cam 209 and second piston 205 connected to and controlled by cam or crankshaft 211 per FIG. 2. Engine 301 further incorporated features known and understood by those skilled in the art, including an intake port 303 gated by piston 203; an exhaust port 305 gated by piston 205; a charge pump 307 formed by a third piston 309 connected to and moving in unison with piston 205; and a one way check valve 311 configured to allow air into charge pump 309. Engine 301 further includes a first chamber 313 for intake charging and a second chamber 315 for scavenging. Chambers 313, 315 are pressurized by piston 309 through two check valves 317, 319. Engine 301 further includes independently controlled valves 321, 323 configured to control the release of intake air and scavenge air into intake port 303. A third independently controlled valve 325 is positioned between exhaust port 305 and an exhaust system 327 to allow expansion of combustion gasses beyond the point where the exhaust port 305 is uncovered by piston 205.

In a preferred embodiment of the present invention, engine 301 further includes a sensor 327 and a pressure release valve 329 associated with chamber 313. Sensor 327 and pressure release valve 329 are configured to regulate the temperature and pressure within chamber 313. As further shown in FIG. 3, distance TD is shown wherein distance TD influence the compression produced by piston 205 before piston 203 begins its stroke, and further influences the expansion stroke of piston 205 available before exhaust port 305 is opened. The travel of piston 205 over distance TD after intake port 303 is closed raises charge pressure and temperature beyond that present in chamber 313, and this must be accommodated in regulation of intake charge pressure and temperature using sensor 327 and valve 329. Finally, distance OE of FIG. 3 represents the travel of piston 205 beyond the in-cylinder exhaust port 305 while exhaust valve 325 remains closed and combustion gasses are over-expanded.

Figure 4:
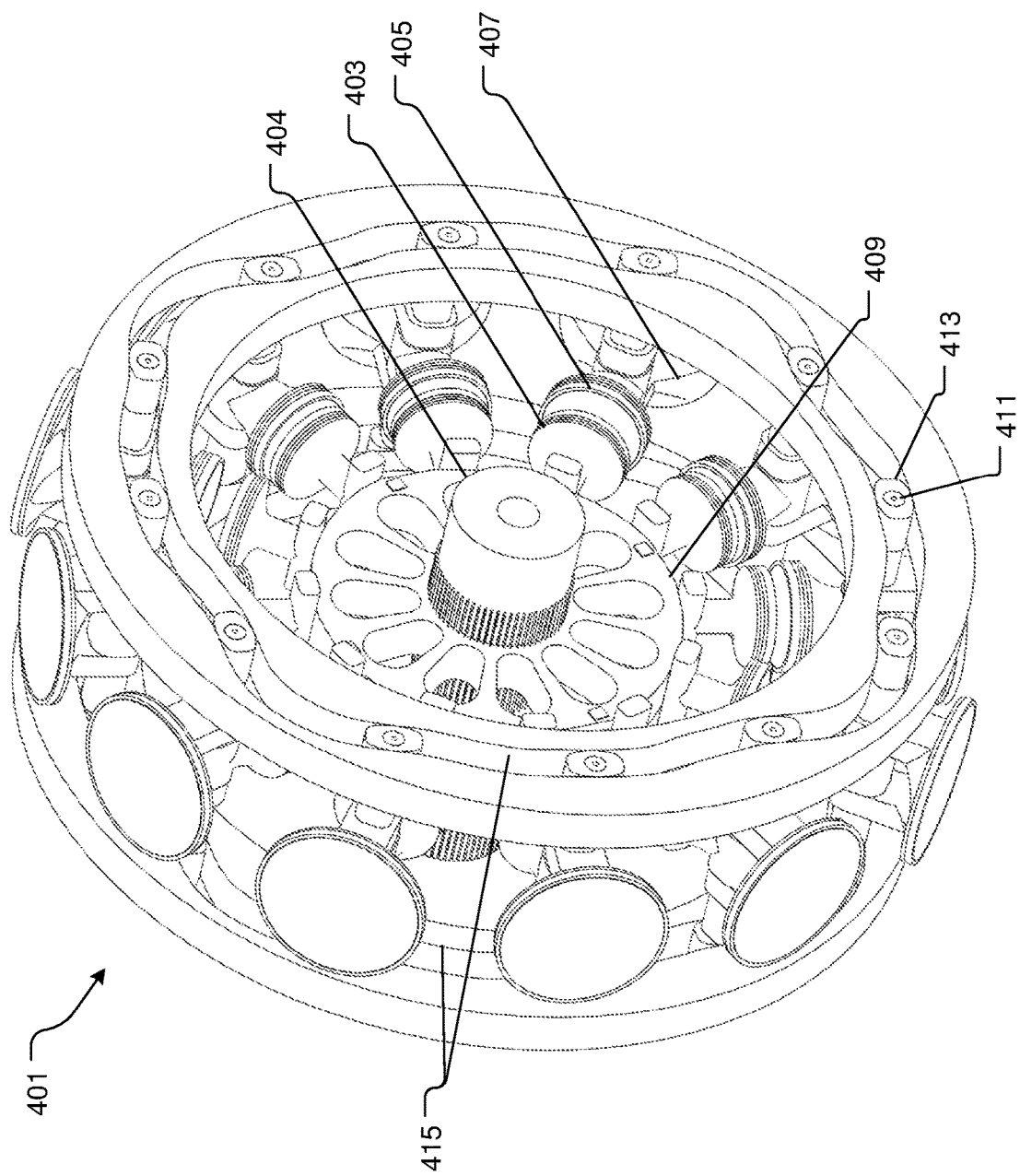
FIG. 4 is oblique view of a cam-driven radial rotary engine incorporating the HCCI combustion apparatus of FIG. 3.

In FIG. 4, an oblique view of a cam-driven radial rotary engine apparatus 401 incorporating the opposed piston two-stroke HCCI combustion apparatus 301 is shown. It should be appreciated that apparatus 401 is contained within an interior space of engine 101. Apparatus 401 includes a radial arrangement of a plurality of coaxial aligned piston sets, wherein each set includes a first piston 403, a second piston 405, and a third piston 407, having the same form and function as depicted and described in FIGS. 2A, 2B, 2C, and 3. The innermost piston of each set, as represented by piston 403 functions as piston 203 described and explained above. The plurality of innermost pistons are driven by a cam 409 installed on central shaft 404. The middle piston within each set of pistons, represented by piston 405 functions as piston 205 described and explained above. The outermost piston is connected to the middle piston and serves the function of piston 309 in FIG. 3. The plurality of middle and outer piston sets are connected via a plurality of cam shafts 411 having a hydrodynamic tilting pad follower 413 configured to engage with a radial cam track 415. It should be appreciated that apparatus 401 is depicted as an example, and other embodiments may employ more or less piston sets and various features of different dimensions. Further, it should be appreciated that the apparatus of FIG. 4 may be operated by holding the cams 409, 415 and central shaft 404 stationary while the cylinder block containing the pistons rotates about the engine axis or, alternatively, the cylinder block containing the pistons may be held stationary while the cams 409, 415 and central shaft rotate about the engine axis.

Figure 5:
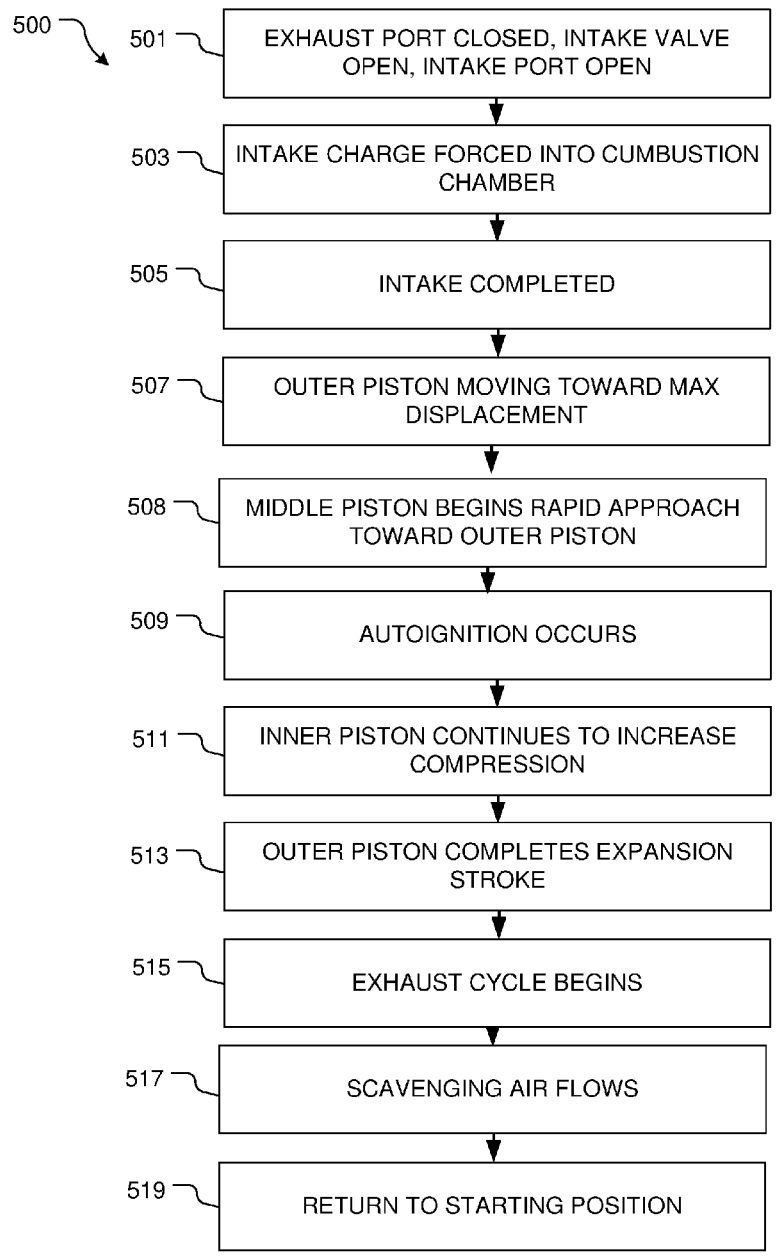
FIG. 5 is a flowchart of the process of an engine cycle associated with FIG. 3.

In FIG. 5 a flowchart 500 depicts an exemplary cycle associated with engine 101. At the beginning of the engine cycle, exhaust port 305 is closed by piston 205, intake port 303 is open per the displacement of piston 203, and intake valve 321 is open, as shown with box 501. Intake charge is forced into chamber 207 under pressure created by charge piston 309, as shown with box 503. Intake is completed and piston 203 begins moving to cover intake port 303, and valve 321 begins closing, as shown with box 505. Once intake port 303 is closed, piston 205 begins moving to maximum displacement, as shown with box 507. When piston 205 is fully displaced per box 507, the portion of the combustion chamber controlled by piston 205 is at its minimum, and the fuel-air charge in chamber 207 is nominally below autoignition temperature. Piston 203 begins a rapid approach toward piston 205 shortly after piston 205 begins its expansion stroke, as shown in box. Autoignition occurs shortly after piston 205 begins the expansion stroke, as shown with box 509. At this time, the angle and displacement from the engine axis of cam 209 combined with the diameter of the inner piston 203 must produce less torque on output shaft 404 than produced by piston 205 and its associated cam parameters to prevent reverse rotation. It's important to understand piston 203 continues to increase compression beyond that required for autoignition under nominal conditions, as shown with box 511.

The additional compression occurring after autoignition can provide margin to facilitate cold start and reduce lean misfire. In addition, the additional compression can improve efficiency during warm operation to the extent it occurs during ignition and propagation delay of combustion within the cylinder during high speed operation of the engine.

Piston 205 completes an expansion stroke as shown with box 513. During this time, exhaust valve 325 remains closed, thereby retaining pressure after port 305 is uncovered. When exhaust valve 325 opens, piston 205 begins an exhaust cycle to push any residual gasses out of exhaust port 305 and valve 325, as shown with box 515. Piston 203 moves to uncover the intake port during this exhaust cycle. Once piston 203 has fully recovered to a minimum displacement, uncovering port 303, the valve 323 opens and scavenging air begins to flow from chamber 315 through port 303 and port 305, as shown with box 517, at which point piston 205 returns to a position covering exhaust port 305 and the cycle can begin again, as shown with box 519.

Figure 6:
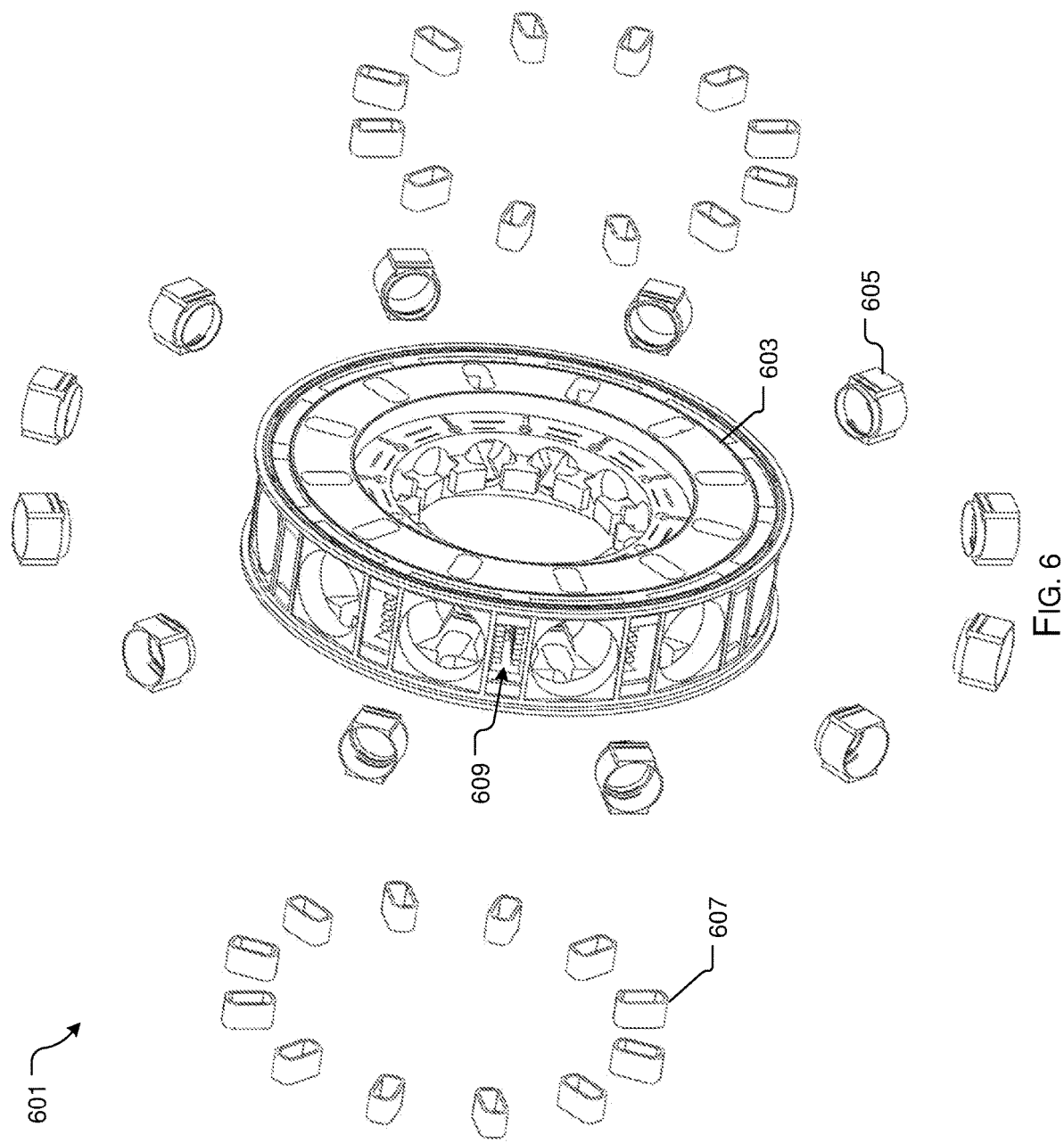
FIG. 6 is an exploded view of a rotor block in accordance with the present invention.

In FIG. 6, an exploded view of an assembly of a cylinder block 601 incorporated into engine 101 is shown. Cylinder block 601 includes a body 603 containing a plurality of cylinder liners 605 configured to house the innermost and middle pistons of each piston set and provide an intake port and an exhaust port. Cylinder block 601 further includes a plurality of bushings 607 configured to bear loads imposed on block 601. Block 601 further includes one or more vanes of a centrifugal fan 609 for cooling the plurality of pistons and various components of block 601.

Figure 7:
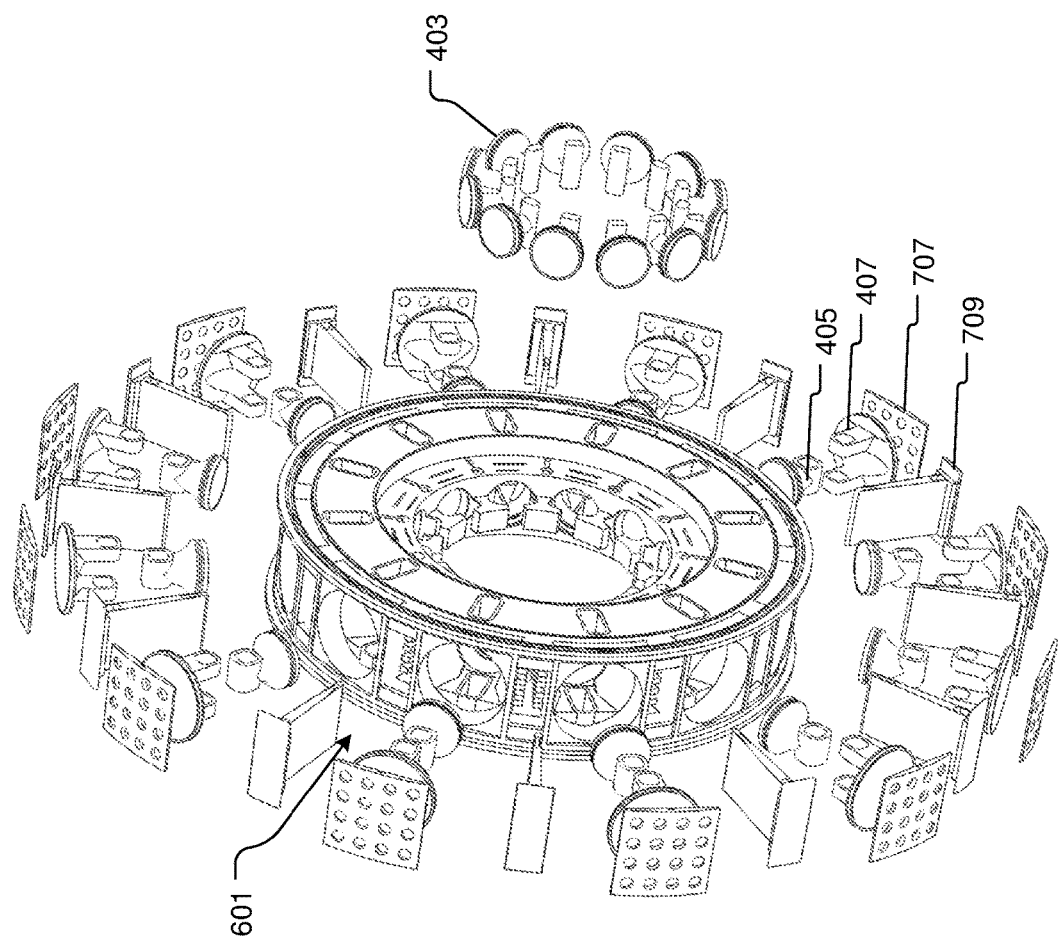
FIG. 7 is an exploded view of components inserted radially into the rotor block of FIG. 6.

In FIG. 7, an exploded view of the components inserted radially into cylinder block 601 are shown to create a partially assembled rotor 701. Components include the plurality of piston sets, each having an inner piston 403, a middle piston 405, and an outer piston 407. Radial block 701 further includes a plurality of reed valve assemblies 707, which incorporate the one-way check valves discussed above in FIG. 3 associated with the charge pump. Block 701 further includes a plurality of inserts 709 configured to direct cooling air from inlets of the centrifugal fan and exhaust gasses from the combustion chambers to side ports on the front and back of the rotor.

Figure 8:
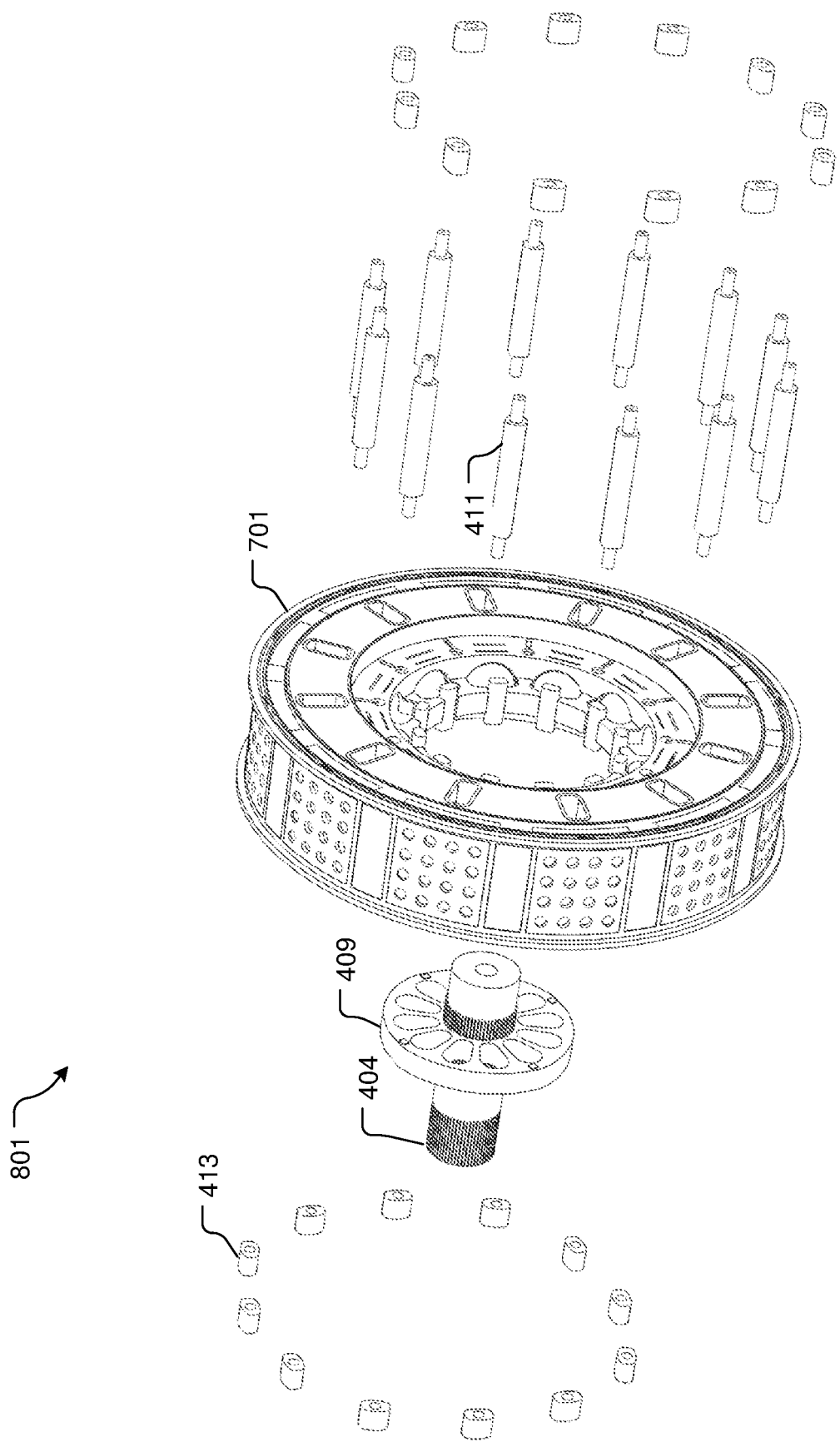
FIG. 8 is an exploded view of components inserted axially into the rotor of FIG. 6.

In FIG. 8, an exploded view of the components inserted axially into the partially assembled rotor 701 is shown. Cam shafts 411 are installed axially through the rotor, connecting the outer piston and middle piston of each set. Hydrodynamic tilting pad cam followers 413 are then installed on either end of each cam shaft. Further, inner cam 409 is installed on central shaft 404 and the resulting assembly installed in the rotor.

Figure 9:
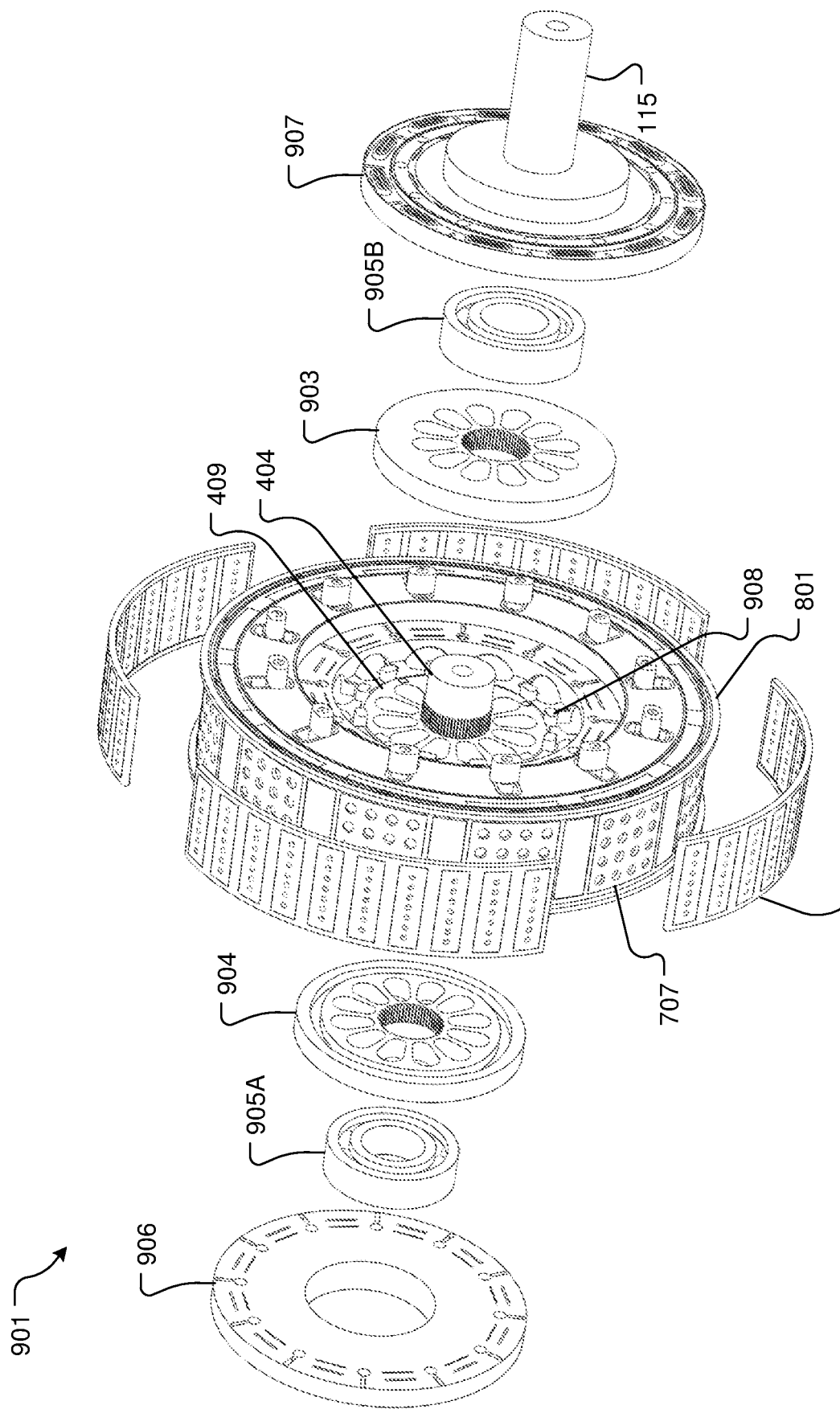
FIG. 9 is an exploded view of components installed during final rotor assembly.

In FIG. 9, an exploded view showing further assembly of a complete rotor 901 for use with engine 101 is shown. Engine 101 can optionally include a motor/generator, and if installed, a plurality of magnets 902 are installed on the rotor periphery. The magnets incorporate cooling passages through which air into the reed valve assemblies 707 is drawn. Push cam 409 is augmented by pull cams 903, 904 installed on either side and engaging the follower 908 of each inner piston. Further, bearings 905a, 905b, are installed on either side of central shaft 404, and rotor interface plates 906, 907 are installed over bearings 905A, 905B. A front rotor interface plate 907 incorporates the output shaft 115 used for engine output, while rear rotor interface plate 906 provides an opening for central shaft 404 to pass outside the rotor assembly.

Figure 10:
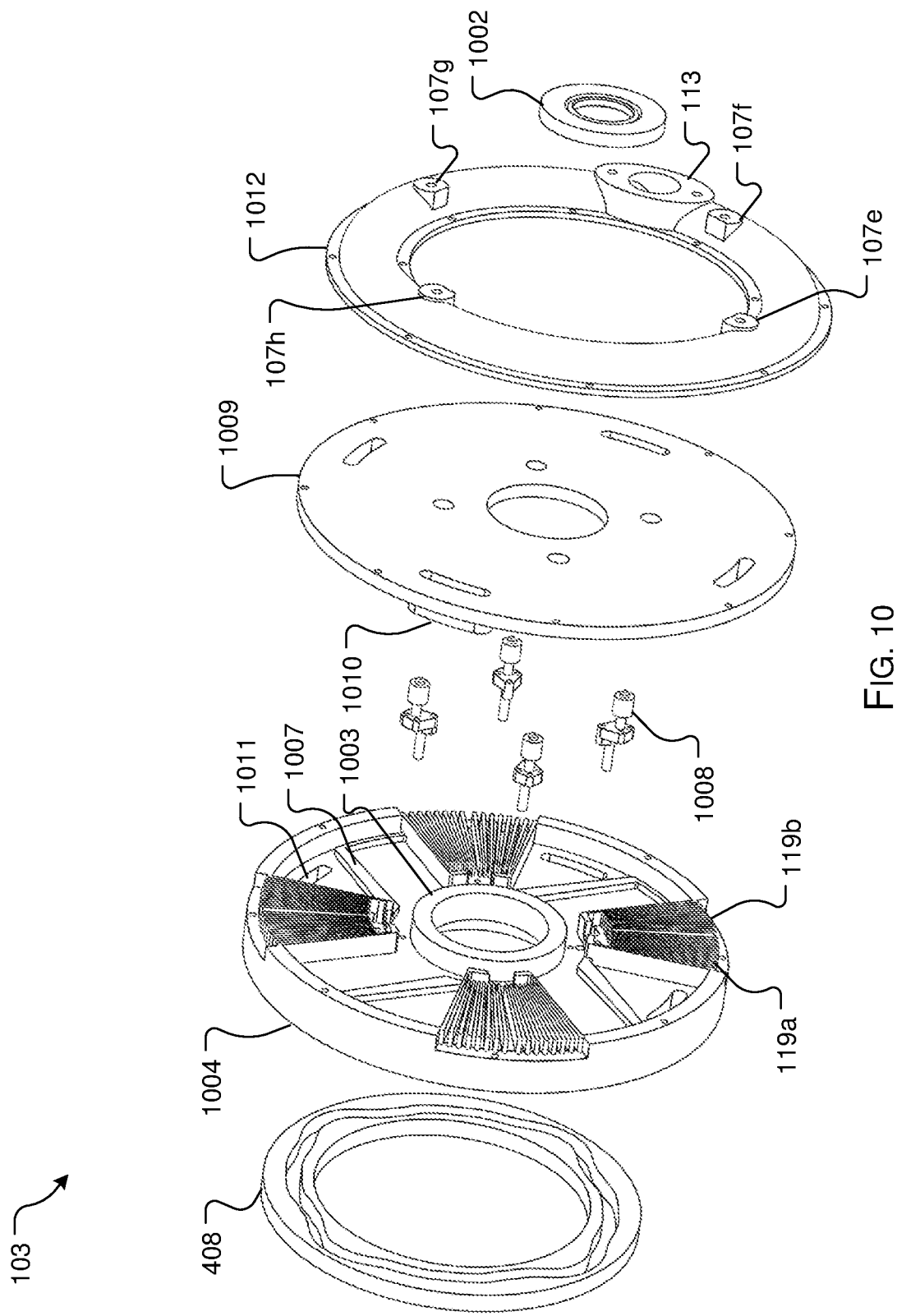
FIG. 10 is an exploded oblique view of a side plate in accordance with the present invention.

In FIG. 10, an exploded oblique view of front plate 103 is shown. It should be appreciated that rear side plate 105 is substantially similar in form and function to plate 103. A side plate body 1004 incorporates a plurality of finned passages 119a, 119b through which charge air from the rotor is passed to the intake port of the rotor, and oil from the periphery of the rotor passes back to ports near the center of the rotor. Air from the periphery of the side plate is drawn over passages 119a, 119b as it progresses to the inlet of the centrifugal fan within the rotor, thus cooling both the intake air charge and engine oil. It should be appreciated that additional passages 1007 for carrying scavenge air can include similar cooling features.

In the preferred embodiment, plate 103 includes fuel injector assemblies 1008 configured to add fuel to the charge air as it moves to the rotor intake ports. These injector assemblies 1008 also incorporate the sensor and pressure relief valves of FIG. 3. A cover plate 1009 is installed over side plate body 1004. Plate 1009 contains a plurality of passages 1010 connected to a plurality of ports 1011 configured to carry exhaust gas combined with outlet air of the centrifugal fan through the side plate body 1004. These combined gasses are passed into a chamber formed by installation of an exhaust manifold 1012 which incorporates an outlet to the exhaust system 113 as well as motor mounts 107e-h. A seal 1002, which prevents leakage of oil around output shaft 115, is then installed in the sideplate.

Figure 11:
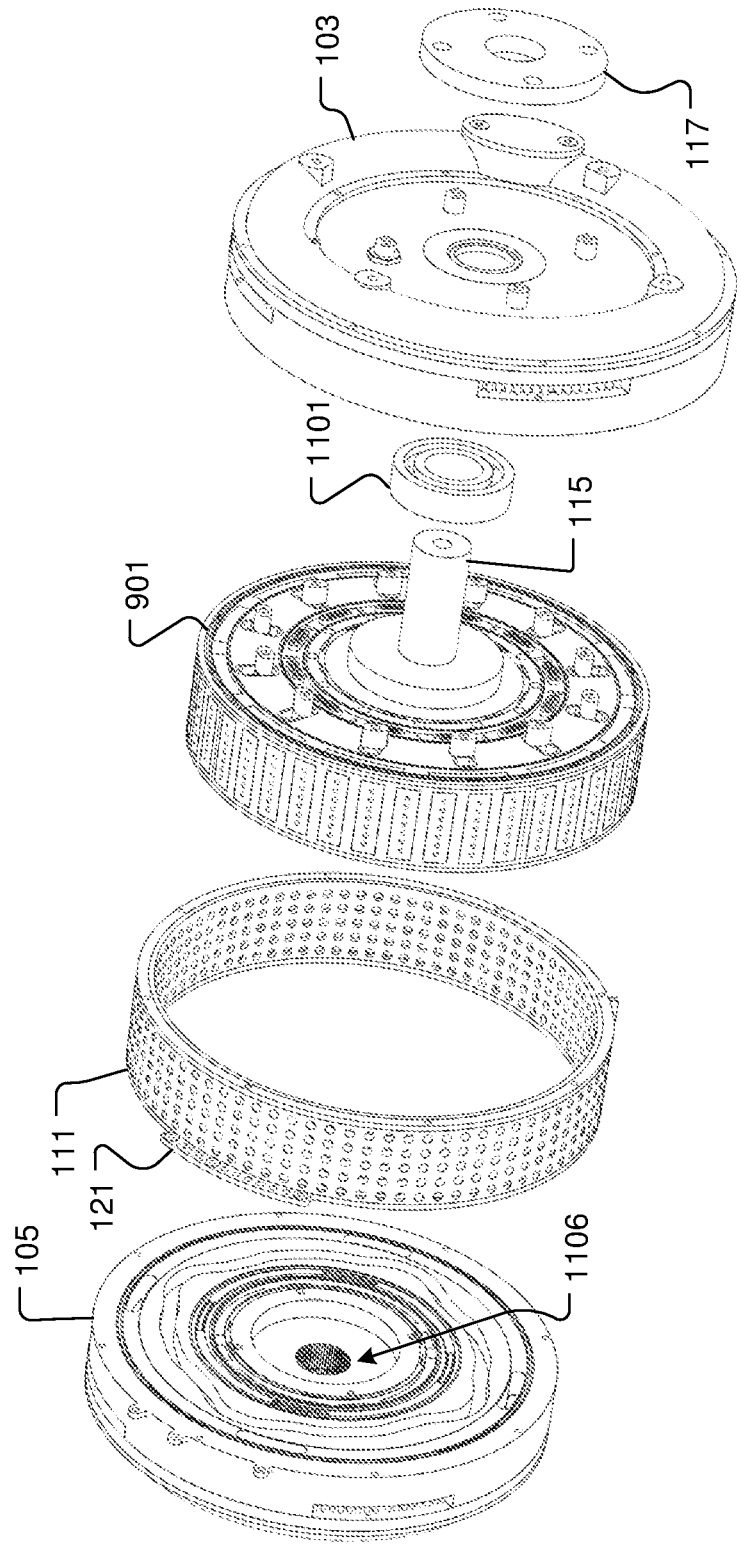
FIG. 11 is an exploded view of the assembly of the engine of FIGS. 1A and 1B.

In FIG. 11, an exploded view of the assembly of engine 101 is shown. A bearing 1101 is installed onto output shaft 115 of the rotor 901, front side plate 103 is installed over bearing 1101, and output plate 117 is installed on the end of shaft 115. Further, radial housing 111 is installed over rotor 901.

The radial housing 111 incorporates cavities for air cleaner elements under a removable cover, thereby allowing access to those elements. Housing 111 further incorporates the stationary components of the optional motor/generator, including coils, hall effect sensors, and electrical interfaces. The coils, which incorporate passages for air flowing into reed valve assemblies 707, are mounted on the inner surface of the radial housing, where they are in proximity to the magnets 902 around the periphery of rotor 901. Engine 101 assembly is completed by the installation of rear side plate 105. Plate 105 is attached to central shaft 404 via splines 1106 to prevent rotation of the inner cam.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cam-driven opposed-piston radial engine, comprising:
    a plurality of cylinder sets arranged about a central shaft, each of the plurality of cylinder sets having:
        a first cylinder, having:
            an intake port;
            a second cylinder coaxially aligned with the first cylinder, the
        second cylinder having:
            an exhaust port;
            a first piston engaged within the first cylinder;
            a second piston engaged within the second cylinder;
            a combustion chamber formed between the first piston and the second piston;

a first cam mechanically engaged with the first piston;
a second cam mechanically engaged with the second piston;
wherein the first cam controls displacement of the first piston within the first cylinder and converts reciprocating motion to rotational motion;
wherein the second cam controls displacement of the second piston within the first cylinder and converts reciprocating motion to rotational motion;
a cylinder block configured to contain the plurality of cylinder sets;
a first plate;
a second plate;
an ignition source configured to initiate combustion within the combustion chamber;
wherein the first plate and second plate encompass the cylinder block; and
wherein the first cam and the second cam compress the first piston and the second piston together to compress a fuel air charge within the combustion chamber;
wherein each of the plurality of cylinder sets further comprises an air pump comprising:
a third cylinder coaxially aligned with the first cylinder and the second cylinder; and
a third piston contained within the third cylinder;
wherein the third piston is connected to the second piston;
wherein the third piston moves in unison with the second piston;
wherein the air pump flushes residual gasses from the combustion chamber; and
wherein the air pump forces a fuel-air mixture into the combustion chamber.

2. The engine of claim 1, wherein the ignition source is a spark plug.

3. The engine of claim 1, wherein the ignition source is a fuel injector.

4. The engine of claim 1, wherein the ignition source is heat developed by compression of a homogeneous fuel-air charge or HCCI.

5. The engine of claim 1, further comprising:
an electrical generator, having:
magnets on either a rotating or stationary assembly;
coils on either the rotating or stationary assembly; and
a controller;
wherein motion between the rotating and stationary assembly generates electrical power.

6. The engine of claim 5, further comprising:
an electrical storage device;
wherein the controller causes the magnets and coils to produce electrical power directed in part or whole to the electrical storage device;
wherein the controller causes electrical power from the electrical storage device to be applied in whole or in part to the assembly to produce torque on the output shaft; and
wherein the torque may be in either the forward or reverse direction.

7. The engine of claim 1, wherein the cylinder block is configured to rotate while the central shaft and the first and second cam remain stationary.

8. The engine of claim 7, further comprising:
a centrifugal oil pump incorporated into the cylinder block, the centrifugal oil pump having:
a plurality of passages into the cylinder block;
wherein a rotation of the cylinder block forces oil to circulate through the plurality of passages.

9. The engine of claim 7, further comprising: a centrifugal fan, having:
a plurality of vanes positioned radially between the cylinder sets of the cylinder block;
wherein air is drawn into the cylinder block near the central shaft and exits at a periphery of the cylinder block.

10. The engine of claim 9, further comprising:
a passageway configured to route centrifugal fan inlet air through a radiator configured to cool intake air to the intake valve.

11. The engine of claim 9, further comprising:
a passageway configured to route centrifugal fan inlet air through a radiator configured to cool engine oil.

* * * * *